(12) United States Patent
Kyo et al.

(10) Patent No.: US 9,923,671 B2
(45) Date of Patent: Mar. 20, 2018

(54) COMMUNICATION DEVICE

(71) Applicant: DENSO CORPORATION, Kariya, Aichi-pref. (JP)

(72) Inventors: Takuma Kyo, Kariya (JP); Hidenori Akita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/358,304

(22) Filed: Nov. 22, 2016

(65) Prior Publication Data

US 2017/0155477 A1 Jun. 1, 2017

(30) Foreign Application Priority Data

Dec. 1, 2015 (JP) .................. 2015-234930

(51) Int. Cl.
*H04L 1/18* (2006.01)
*G06F 1/00* (2006.01)
*H04L 1/08* (2006.01)
*H04L 1/00* (2006.01)
*H04W 28/02* (2009.01)
*H04W 72/04* (2009.01)
*H04W 72/12* (2009.01)
*H04J 1/00* (2006.01)
*H04W 28/18* (2009.01)

(52) U.S. Cl.
CPC .............. *H04L 1/08* (2013.01); *H04L 1/0041* (2013.01); *H04W 28/0278* (2013.01); *H04W 72/042* (2013.01); *H04W 72/0413* (2013.01); *H04W 72/1284* (2013.01); *H04J 1/00* (2013.01); *H04W 28/18* (2013.01)

(58) Field of Classification Search
CPC .... H04L 1/08; H04L 1/0041; H04W 28/0287; H04W 72/0413; H04W 72/042; H04W 72/1284; H04J 1/00; G06F 11/14; G06F 11/00
See application file for complete search history.

(56) References Cited

U.S. PATENT DOCUMENTS

2010/0080185 A1 4/2010 Guo
2012/0039263 A1 2/2012 Moberg et al.
(Continued)

FOREIGN PATENT DOCUMENTS

JP 2010-081597 A 4/2010
JP 2011-518468 A 6/2011
(Continued)

Primary Examiner — Christine T. Tu
(74) Attorney, Agent, or Firm — Harness, Dickey & Pierce, P.L.C.

(57) ABSTRACT

A communication control part includes a delivered value storing part, a replacement value storing part and a set value changing part in addition to a retransmission BSR timer. The delivered value storing part stores a delivered value delivered from a radio base station as a timer set value for the retransmission BSR timer. The replacement value storing part stores a replacement value, which is to be applied as the timer set value as a substitute of the delivered value. The set value changing part F5 sets the delivered value as the timer set value when data is not present in a LCG buffer, which corresponds to a particular application. The set value changing part sets the replacement value as the timer set value when data is present in the LCG buffer, which corresponds to the particular application.

9 Claims, 6 Drawing Sheets

(56) References Cited

U.S. PATENT DOCUMENTS

| | | |
|---|---|---|
| 2014/0022933 A1 | 1/2014 | Yi et al. |
| 2014/0036885 A1 | 2/2014 | Moberg et al. |
| 2015/0201339 A1 | 7/2015 | Yi et al. |
| 2016/0173355 A1 | 6/2016 | Yi et al. |

FOREIGN PATENT DOCUMENTS

| | | |
|---|---|---|
| JP | 2014-023155 | 2/2014 |
| JP | 2014-138310 A | 7/2014 |

| APPLICATION | REPLACEMENT VALUE Trep |
|---|---|
| DRIVING ASSIST, PREVENTIVE SAFETY | 10 |
| WEB BROWSING | 320 |
| DEVICE OPERATION STATUS CONFIRMATION | 640 |

| APPLICATION OF UE | REPLACEMENT VALUE Trep |
|---|---|
| VEHICLE | 10 |
| MOBILE PHONE | 320 |
| AUTOMATIC VENDING MACHINE, MACHINE TOOL | 640 |

COMMUNICATION DEVICE

CROSS REFERENCE TO RELATED APPLICATION

This application is based on Japanese patent application No. 2015-234930 filed on Dec. 1, 2015, the whole contents of which are incorporated herein by reference.

FIELD

The present disclosure relates to a communication device used in a radio communication system, in which a communication device of a user side reports an amount of data remaining in a buffer to a radio base station and the radio base station allocates communication resources in accordance with the remaining amount of data.

BACKGROUND

High speed radio communication services are widely available recently with advent of broad band radio communication standards such as high speed packet access (HSPA) and long term evolution (LTE).

In uplink communication of LTE, a radio access method based on frequency-division multiple access (FDMA) is adopted. That is, the radio base station (eNodeB: evolved nodeB) provides the communication device of the user side with a communication band in accordance with the amount of data, which has not been transmitted yet and remains in the communication device of the user side, so that the communication resources are used efficiently. The communication device of the user side is referred to as user equipment (UE).

Specifically, when the UE receives data in its buffer to be transmitted in the uplink, the UE transmits a scheduling request (SR), which requests allocation of grant, through a physical uplink control channel (PUCCH). Here, "grant" indicates frequency, timing, modulation method and the like, which are used for transmission of uplink data. The PUCCH is a communication channel, which is used in the uplink communication for connection control of communication.

Upon receiving the SR from the UE, the radio base station allocates a grant and commands data transmission under the allocated grant through a physical downlink control channel (PDCCH). The PDCCH is a communication channel, which is used in downlink communication for connection control of communication.

The UE transmits a buffer status report (BSR), which indicates the amount of data remaining in the buffer as data waiting for transmission, through a physical uplink shared channel (PUSCH) corresponding to the grant commanded from the radio base station. The PUSCH is a common data channel for transmitting uplink data.

Upon receiving the BSR, the radio base station re-allocates the grant in accordance with the amount of data indicated in the BSR and commands through the PDCCH transmission of the data stored in the buffer by the allocated grant. The UE sequentially transmits the data in the buffer by using the commanded grant.

The UE further activates a retransmission BSR timer (retx-BSR-timer) in response to the transmission of BSR as a trigger. The retransmission BSR timer is a timer for retransmission of BSR by regarding loss of defect of BSR. Without receiving the control data, which indicates the grant, by expiration of the retransmission BSR timer, the UE performs processing of the transmission of SR, reception of grant and retransmission of BSR.

The BSR is transmitted not only when the retransmission BSR timer expires but also when a periodic BSR timer expires as disclosed in JP 2014-138310.

It is a recent trend to provide not only mobile terminals such as smart phones but also automotive vehicles, machine tools, automatic vending machines and the like with radio communication functions (broad band radio communication function), which complies broad band radio communication standards for realizing high speed data communication. This addition of the radio communication function on various articles will improve added value of products and services, enhance after-service and improve operation efficiency.

For example, in a case that a machine tool is provided with a broad band radio communication function, it is possible to readily monitor time, status and position of operation of the machine tool from remote locations. Further, in a case that a vehicle is provided with a broad band radio communication function, it is possible to provide real-time information services such as traffic information and navigation and monitor position, travel state and compartment temperature of the vehicle on a real-time basis from remote locations. As the purpose of using (that is, application) of the radio communication function spreads widely, it is assumed that more and more services requiring real-time property of communication (that is, small communication delay) and application software (simply referred to as applications) for realizing such are assumed to be developed.

However, when the transmitted BSR is lost, the UE does not restart the uplink communication until the retransmission BSR timer expires. Thus a time interval from activation to expiration of the retransmission BSR timer results in the communication delay.

For this reason, the retransmission BSR timer is set preferably to a relatively small value for applications, which require small communication delay. On the other hand, the retransmission BSR timer is set preferably to a relatively large value for applications, which do not require high real-time property, thereby to limit excessive transmission of BSR.

That is, the retransmission BSR timer in one UE is preferably set in correspondence to real-time property required by the application, which uses the radio communication function provided by the UE. The retransmission BSR timer is presently configured to be set to a value (simply referred to as notified set value), which is transmitted from the radio base station.

SUMMARY

It is therefore an object to provide a communication device capable of using, as a set value of a retransmission BSR timer, a value of real-time property, which application software requires for providing a predetermined service.

According to one aspect, a communication device is provided for radio communication with a radio base station in a radio communication system. The communication device includes a transmission processing part and a retransmission processing part. The transmission processing part transmits a buffer status report, which indicates an amount of data remaining in a buffer, to the radio base station, and the retransmission processing part performs processing for retransmitting the buffer status report when an elapse of time after transmission of the buffer status report reaches a timer set value. The radio base station allocates a communication resource for the communication device in accordance with the amount of data indicated by the buffer status report transmitted from the communication device.

The communication device comprises a delivered value storing processing part, a replacement value storing part, a checking part and a set value changing part. The delivered value storing processing part acquires a delivered value, which is delivered from the radio base station and to be used as the timer set value, and stores the delivered value in a delivered value storing part, which is provided by a predetermined storage medium. The replacement value storing part pre-stores a replacement value, which is settable as the timer set value in place of the delivered value. The checking part checks whether a replacement value application condition for using the replacement value as the timer set value is satisfied. The set value changing part sets the replacement value as the timer set value when the checking part determines that the replacement value application condition is satisfied, and sets the delivered value as the timer set value when the checking part fails to determine that the replacement value application condition is satisfied.

EMBODIMENT

Figure 1:
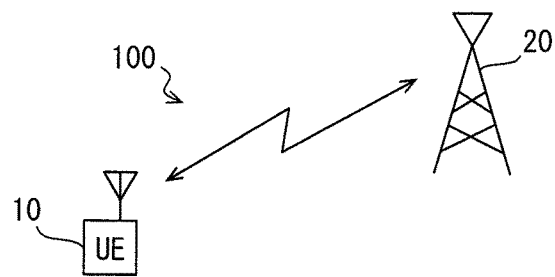
FIG. 1 is a schematic illustration showing a radio communication system according to a present embodiment.

Referring first to FIG. 1, a radio communication system 100 is configured to provide radio communication conforming to LTE (long term evolution), which is a broad band radio communication standard.

The radio communication system 100 includes a user equipment (UE) 10 as a communication device at a user side and a radio base station 20. The radio base station 20 is provided as one facility, which operates as an eNodeB, to allocate communication resources (that is, scheduling) for each UE 10.

The UE 10 is a communication device. Although only one UE 10 is shown in FIG. 1 for simplicity, plural UEs 10 may be provided. Similarly plural radio base stations 20 may be provided.

The UE 10 may be a mobile communication terminal such as a portable smart phone and a tablet terminal or may be a communication terminal mounted in an automotive vehicle. Further, the UE 10 may be provided in a machine tool, a heavy-duty machine or an automatic vending machine of canned drinks. As one example, the UE 10 is assumed to be a communication device used in an automotive vehicle. This vehicle provided with the UE 10 is referred to as a subject vehicle.

<Radio Communication System 100>

First, processing of communication between the UE 10 and the radio base station 20 will be described. It is assumed in the following description that a communication network from the UE 10 to the radio base station 20 is an uplink and a communication network from the radio base station 20 to the UE 10 is a downlink. In uplink communication of the LTE, an FDMA-based radio access method is used so that the radio base station 20 provides each UE 10 with a communication resource in accordance with an amount of data, which has not been transmitted and is maintained in the UE 10.

Figure 2:
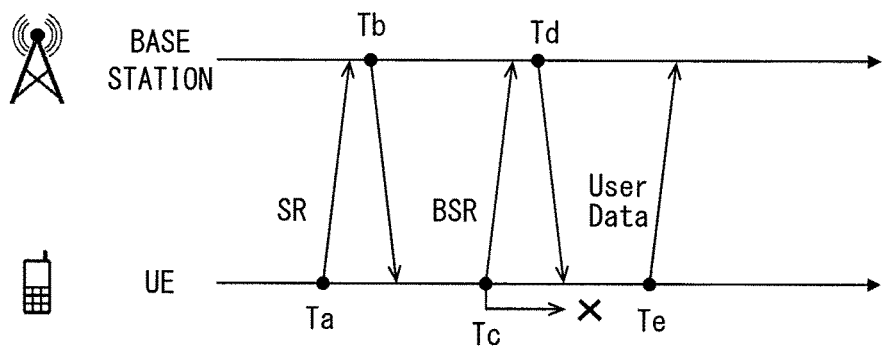
FIG. 2 is a sequence diagram showing one exemplary processing between user equipment and a radio base station.

More specifically, when data to be transmitted in the uplink arrives in the buffer of the UE 10, the UE 10 transmits the SR requesting permission of transmission of such data to the radio base station 20 through PUCCH as shown in FIG. 2. Time Ta in FIG. 2 indicates timing, at which the UE 10 transmits the SR.

The provision of data, which arrives in the buffer, is application software (referred to simply as application) installed in the UE 10 itself or a computer connected with the UE 10 to be mutually communicably. It is assumed in the present embodiment that the application is installed in the UE 10 itself as one example. The data, which arrives in the buffer, include data for connection control of communication.

Upon receiving the SR from the UE 10, the radio base station 20 allocates a grant for transmitting a buffer status report (BSR) to the UE 10. The BSR is a data, which indicates an amount of data stored in the buffer as data waiting for transmission. The grant corresponds to the communication resource described above and indicates a frequency, timing, modulation method and the like, which are to be used in transmitting data.

For transmission of BSR and data by the UE 10, the PUSCH is used. That is, the grant allocated to the radio base station 20 in response to the reception of the SR is a grant of PUSCH.

The radio base station 20 makes a notification of the grant allocated to the UE 10 through the PDCCH. For simplicity, a communication packet transmitted from the radio base station 20 and indicating a grant for the uplink communication is referred to as a grant designation data. Time Tb in FIG. 2 indicates timing, at which the radio base station 20 transmits the grant designation data.

Upon receiving the grant designation data transmitted from the radio base station 20, the UE 10 transmits the BSR by using the PUSCH corresponding to the grant designated by the radio base station 20. Time Tc in FIG. 2 indicates timing, at which the UE 10 transmits the BSR.

In a case that the grant allocated for the BSR transmission has allowances for communication resources required for the BSR transmission, the UE 10 is capable of transmitting a part or all of the data stored in the buffer by using such extra communication resources.

Upon receiving the BSR from the UE 10, the radio base station 20 reallocates a grant in accordance with an amount of data indicated in the BSR and transmits a grant communication data, which indicates the reallocated grant. Time Td in FIG. 2 indicates timing, at which the grant notification data is transmitted as a response to the BSR. The UE 10 sequentially transmits data remaining in its buffer by using the designated grant after time Te.

In the LTE, plural logical channels are used for the uplink communication. The plural logical channels are divided into plural logical channel groups (LCGs). It is assumed as one example that the logical channels are divided into four LCGs, which are LCG1, LCG2, LCG3 and LCG4. It may be arbitrarily designed which logical channel belongs to which logical channel group, that is, correlation between logical channels and logical channel groups.

Each LCG is assigned a LCG number so that the plural LCGs may be divided one another by respective assigned LCG numbers. Each logical channel is assigned an individual logical channel identifier (LCID) so that each logical channel may be identified to which LCG it belongs based on the assigned LCG. That is, each LCID is correlated to either one of four LCG numbers.

As a header of each data, the LCID of the logical channel used for data transmission is attached. The logical channel to be used by the data is determined by the application, which generates the data. It may be arbitrarily designed which logical channel should be used for which application of data transmission. Each of a variety of applications is assigned an LCID of the logical channel, which is used by such an application.

The UE 10 activates the retransmission BSR timer (retx-BSR timer) in response to the BSR, which is transmitted at time Tc, as a trigger. The retransmission BSR timer is a timer, which regards that the BSR is lost and determines necessity of retransmission of the BSR. The set value of time (timer set value Tretx), which the retransmission BSR timer measures, is delivered from the radio base station 20. The set value of the retransmission BSR timer delivered from the radio base station 20 is referred to as a delivered value Tdlv.

Figure 3:
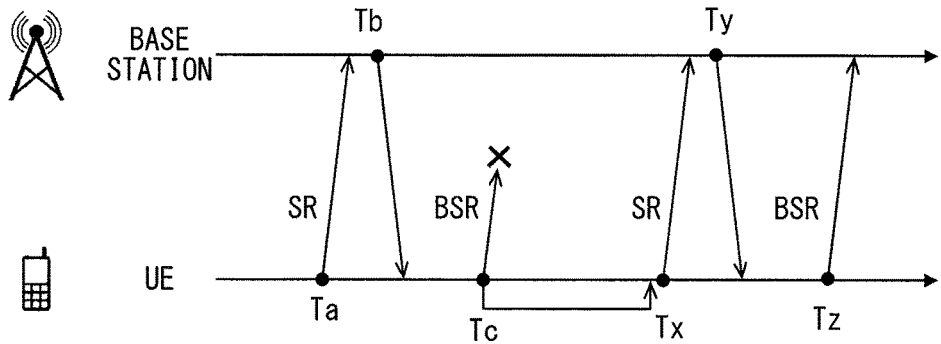
FIG. 3 is a sequence diagram showing another exemplary processing between the user equipment and the radio base station.

FIG. 2 referred to above shows an operation of the UE 10 in a case that the grant notification data is received before the retransmission BSR timer expires. As the other example, FIG. 3 shows an operation of the UE 10 in a case that the grant notification data is not received before the retransmission BSR timer expires.

When the UE 10 fails to receive the grant notification data before a retransmission BSR timer expires, that is, the retransmission BSR timer completes counting a predetermined time period, the UE 10 repeats the series of processing for acquiring the grant for data transmission from the transmission of SR. That is, the UE 10 retransmits the SR at time Tx. When the UE 10 receives the grant indication data, it retransmits the BSR at time Tz in the similar way as that of time Tc in FIG. 2. Time Ty in FIG. 3 indicates timing, at which the radio base station 20 transmitted the grant indication data in response to the SR, which the UE 10 retransmitted.

<UE 10>

Figure 4:
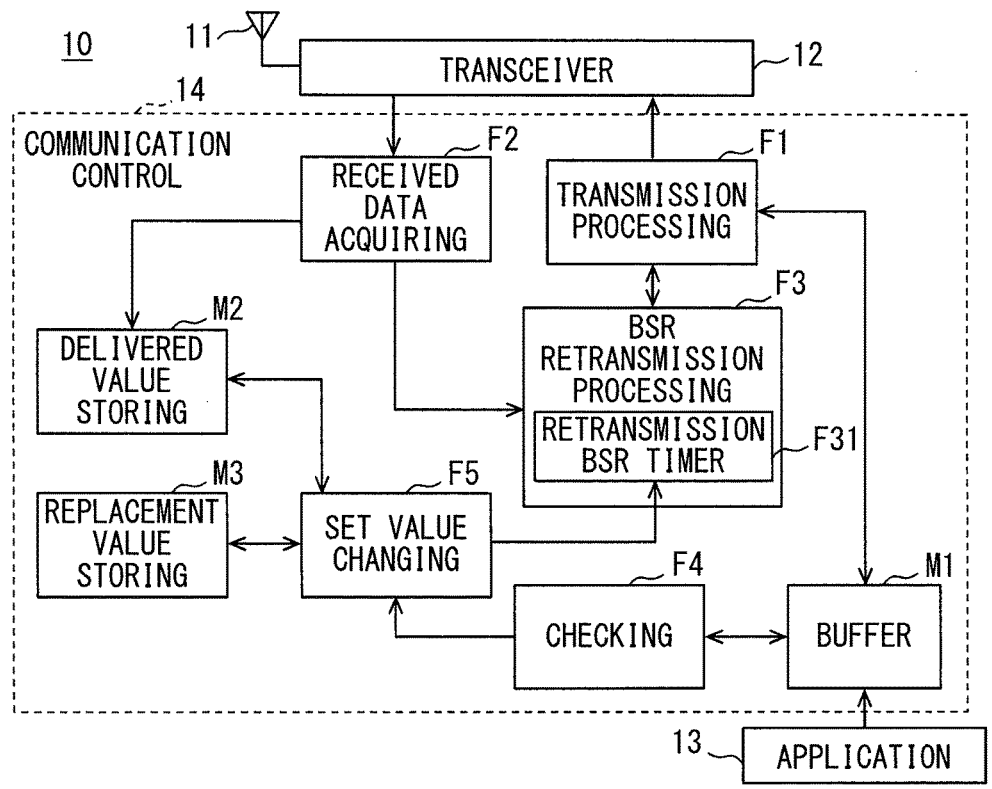
FIG. 4 is a block diagram showing one exemplary configuration of the user equipment.

Configuration and operation of the UE 10 according to the present embodiment will be described below with reference to FIG. 4. The UE 10 includes an antenna 11, a transceiver 12, an application part 13 and a communication control part 14. The antenna 11 is for communication with the radio base station 20. The antenna 11 is configured to be capable of transmitting and receiving radio waves in a frequency band used by the LTE. The antenna 11 is electrically connected with the transceiver 12.

The transceiver 12 is a communication module, which takes charge of a physical layer in the radio communication protocol of LTE. The transceiver 12 converts received signals received by the antenna 11 to information series (that is, digital data) expressed by digital values by performing predetermined processing such as analog-digital conversion processing and demodulation processing. The transceiver 12 provides the communication control part 14 with data, which corresponds to the received signal.

The transceiver 12 further generates a carrier wave signal corresponding to inputted data by performing coding, modulation and digital-analog conversion processing on the data inputted from the communication control part 14. The transceiver 12 outputs the generated carrier wave signal to the antenna 11 to be transmitted as the radio wave.

The application part 13 includes a CPU, a RAM, a flash memory, an I/O, a bus line connecting those structural parts and the like. In the flash memory, a variety of applications are installed. The application part 13 executes the installed applications and generates data for uplink transmission. The application part 13 provides the communication control part 14 with the generated data. Contents of the applications installed in the application part 13 may be designed arbitrarily.

It is assumed that four types of applications, that is, application W, application X, application Y and application Z, are installed. It is further assumed that the application X requires relatively higher real-time property (that is, communication of lower delay) than the other applications. For example, the application X is for assisting driving operation of a driver of the subject vehicle. The application X therefore acquires real-time information (driving assist information), which is helpful to assist driving operation of the driver. The driving assist information may be, for example, present positions, travel speeds and travel directions of other vehicles, which are around the subject vehicle.

The communication control part 14 is formed of a general computer, which includes a CPU, a RAM, a flash memory, an I/O, a bus line connecting those structural parts and the like. The ROM stores a program (communication control program) for operating the general computer as the UE 10 of the present embodiment.

The communication control program may be stored in a non-transitory tangible storage medium. By execution of the communication control program by the CPU, the method corresponding to the communication control program is realized.

The communication control part 14 includes, as functional blocks, a transmission processing part F1, a received data acquiring part F2, a BSR retransmission processing part F3, a checking part F4, a set value changing part F5, a buffer M1, a delivered value storing part M2 and a replacement value storing part M3.

Each of the transmission processing part F1, the received data acquiring part F2, the BSR retransmission processing part F3, the checking part F4 and the set value changing part F5 is realized by execution of the communication control program, that is, realized as software. Alternatively, each of the transmission processing part F1, the received data acquiring part F2, the BSR retransmission processing part F3, the checking part F4 and the set value changing part F5 may be realized by either one of hardware, firmware and combination of hardware and software. For realization by hardware, one or plural integrated circuits may be used.

Each of the buffer M1, the delivered value storing part M2 and the replacement value storing part M3 may be realized by a storage medium such as a RAM, which is rewritable. A storage area used as the replacement value storing part M3 is provided differently from a storage areas used as the delivered value storing part M2.

The delivered value storing part M2 stores a delivered value Tdlv delivered from the radio base station 20. The replacement value storing part M3 stores a replacement value Trep, which is a proxy value used as a timer set value Tretx in place of a delivered value Tdlv. The replacement value Trep is set to replace the real-time property (small delay property) of the radio communication required by the application installed in the application part 13.

As one example, the replacement value Trep is set to a value arbitrarily designed to provide the real-time property, which the application X requires. A specific value of the replacement value Trep may be determined by a user of the UE 10, a designer of the UE 10, a development engineer of the application X and the like. One example of replacement value of each application is shown in FIG. 6.

Figures 6, 7:
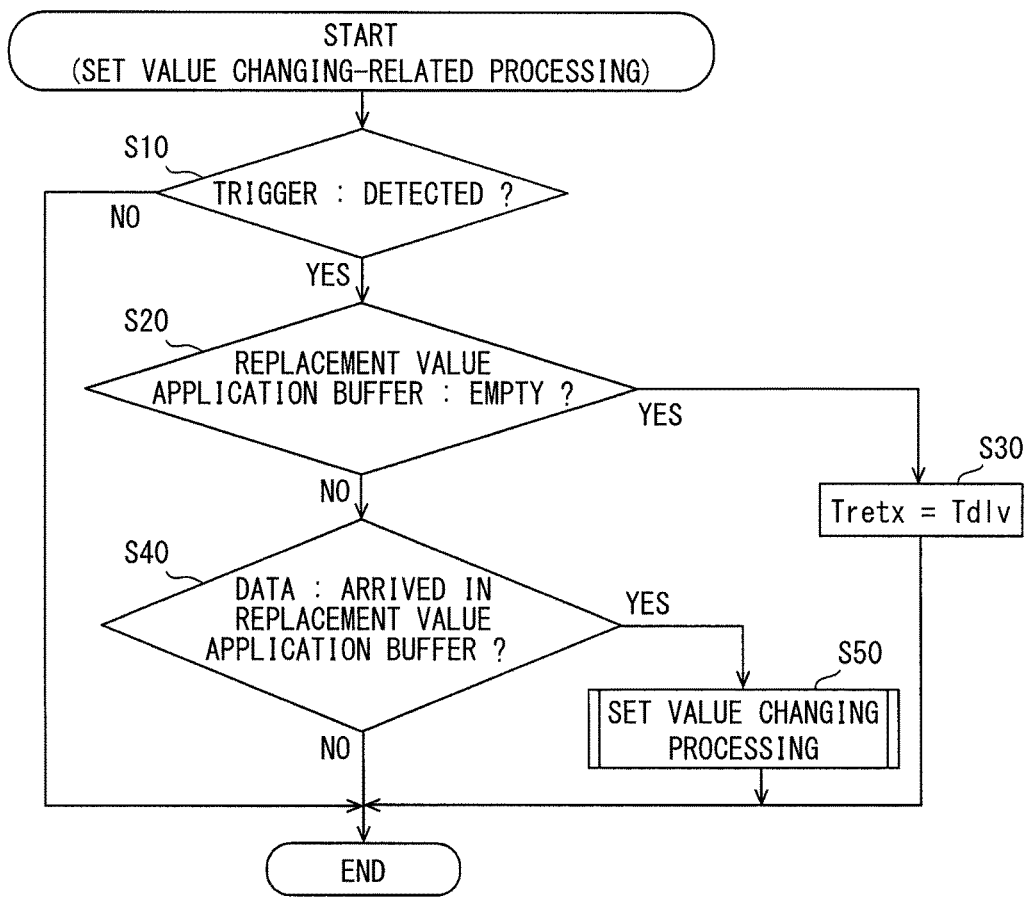
FIG. 6 is a table showing one example of a replacement value of each application.
FIG. 7 is a flowchart showing set value changing-related processing performed in the embodiment.

As shown in FIG. 6, the replacement value Trep for the application, which contributes to realization of safer transport society, such as the application X, which provides the driving assistance, or an application for preventive safety is preferably set to a relatively small value (for example, 10). The replacement value Trep for the application, which monitors the operation state of the automatic vending machine, machine tool and the like, is set to a relatively large value (for example, 640). The replacement value Trep for the application, which provides comfort or convenience to only user of the UE 10 rather than improvement of safety, is set preferably to an intermediate value (for example, 320), which is between the small value and the large value.

In the present embodiment, the replacement value Trep is set to a value, which corresponds to the real-time property requested by the application X, as one example. However, the replacement value Trep is not limited so. The replacement value Trep is preferably set to correspond to the real-time property, which each application installed in the UE 10 requests. For convenience, the replacement value Trep in the present embodiment is smaller than an estimated value (for example, average value or intermediate value) of the delivered value Tdlv delivered from the radio base station 20. The replacement value Trep may be set to a minimum value in a range, which the delivered value Tdlv possibly takes.

The buffer M1 is the storage area for storing temporarily data generated by various applications. The data stored in the buffer M1 is sorted by the LCG corresponding to such data. The LCG corresponding to the data is an LCG, to which the logical channel of the LCID allocated to the data belongs. That is, the buffer M1 is virtually divided by LCG and operated.

Figure 5:
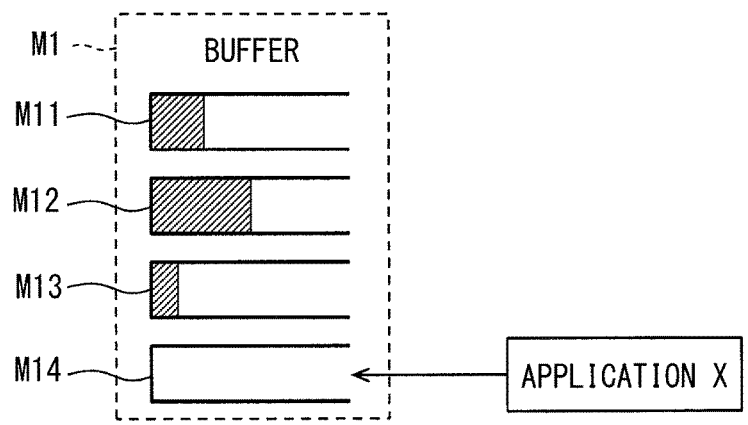
FIG. 5 is an illustration of a buffer used in the embodiment.

FIG. 5 conceptually shows buffers LCG by LCG. As shown in FIG. 5, the buffer M1 includes a buffer M11 for the LCG1, a buffer M12 for the LCG2, a buffer M13 for the LCG3 and a buffer M14 for the LCG4. The buffer for each LCG is referred to as an individual buffer.

As described above, the correlation between each LCID and LCG is predetermined. For this reason, each data generated by the application is determined to which individual buffer M11 to M14 it is stored. It is assumed as one example that the LCID is assigned to the application X so that the data generated by the application X may be stored in the LCG4. That is, presence of data in the buffer M14 for the LCG 4 indicates a possibility that the data generated by the application X is present in the buffer M1.

The transmission processing part F1 transmits the communication packet corresponding to the predetermined data to the radio base station 20 by using the predetermined communication resource in cooperation with the transceiver 12. Specifically, the transmission processing part F1 outputs the SR, BSR and the base band signal corresponding to data to the transceiver 12 for transmission from the antenna 11.

The transmission processing part F1 transmits the SR in such a case that the data arrives in the buffer M1 under a state that the buffer M1 is empty. Here, the transmission processing part F1 is presumed to have a function of monitoring an amount of data remaining in the buffer M1.

The transmission processing part F1 further transmits the BSR, when a condition for transmitting the BSR is satisfied. The BSR is in a data format, which the radio base station 20 is capable of recognizing the amount of data remaining in each LCG. The transmission processing part F1 transmits the BSR not only upon receiving the grant indication data as the response to the SR.

The transmission processing part F1 transmits the BSR, when a periodic BSR timer expires and the retransmission BSR timer expires. The periodic BSR timer periodically transmits the BSR. The periodic BSR timer is activated in response to the transmission of BSR by the transmission processing part F1 as a trigger and starts counting time after the transmission of BSR. The periodic BSR timer expires when the measured time reaches a predetermined periodic transmission time. The periodic BSR timer may be provided in the transmission processing part F1 or in the BSR retransmission part F3 described later.

The received data acquiring part F2 acquires data, which the transceiver 12 receives. The received data acquiring part F2 stores the delivered value Tdlv in the delivered value storage part M2 upon acquiring the data, which includes the delivered value Tdlv. The received data acquiring part F2 thus operates as a delivered value storing processing part.

The BSR retransmission processing part F3 includes the retransmission BSR timer F31 and performs processing for causing the transmission processing part F1 to retransmit the BSR. The retransmission BSR timer F31 is activated when the transmission processing part F1 outputs the BSR to the transceiver 12 as a trigger and starts measuring time, which elapses from transmission of the BSR. The retransmission BSR timer F31 expires when the measured time reaches time, which corresponds to the timer set value Tretx.

When the retransmission BSR timer F31 expires, the BSR retransmission processing part F3 causes the transmission processing part F1 to start transmission of the SR in a case that the grant for transmitting the BSR at that time is not allocated.

In a case that the retransmission BSR timer F31 is configured as a timer of countdown type, the timer set value Tretx operates as an initial value. In a countdown method, the retransmission BSR timer F31 subtracts elapse of time from the timer set value Tretx as the initial value and holds it as the count value. The retransmission BSR timer F31 continues to update the count value and determines the expiration of the retransmission BSR timer F31 when the count value is counted down to 0.

In a case that the retransmission BSR timer F31 is configured as a timer of count-up type, the timer set value Tretx operates as a maximum limit value. In a count-up method, the retransmission BSR timer F31 adds elapse of time from the transmission of BSR and holds it as the count value. The retransmission BSR timer F31 continues to update the count value and determines the expiration of the retransmission BSR timer F31 when the count value is counted up to the timer set value Tretx.

In the case that the retransmission BSR timer F31 operates in the countdown method, the count value itself corresponds to remaining time Trst, which remains until expiration of the timer. In the case that the retransmission BSR timer F31 operates in the countdown method, a difference resulting from subtraction of the present count value from the timer set value corresponds to the remaining time Trst, which remains until expiration of the timer. The retransmission BSR timer F31 may be configured to operate in either the count-up method or countdown method arbitrarily. In the present embodiment, it is assumed that the retransmission BSR timer F31 is configured to operate in the countdown method.

The checking part F4 checks whether the replacement value Trep need be used as the timer set value Tretx based on the status of the buffer M1. In the present embodiment, it is assumed as one example that the replacement value Trep is used as the timer set value Tretx when data is present in the buffer M14 for the LCG (that is, LCG 4), which corresponds to the application X.

The condition for using the replacement value Trep as the timer set value Tretx is a replacement value application condition. That is, in the present embodiment, it is determined that the replacement value application condition is satisfied when data is stored in the LCG4. It is presumed that the checking part F4 also has functions of accessing to the buffer M1 and monitoring the amount of data remaining in the buffer M1 similarly to the transmission processing part F.

The set value changing part F5 changes the timer set value Tretx based on a check result of the checking part F4. That is, the set value changing part F5 sets the replacement value Trep as the timer set value Tretx in a case that the checking part F4 determines that the replacement value Trep need be used as the timer set value Tretx. The set value changing part F5 sets the delivered value Trdlv as the timer set value Tretx in a case that the checking part F4 does not determine that the replacement value Trep need be used as the timer set value Tretx. Detailed operation of the set value changing part F5 will be described later.

<Set Value Changing Processing>

The set value changing-related processing performed by the communication control part 14 will be described with reference to a flowchart shown in FIG. 7. The set value changing-related processing dynamically changes the timer set value Tretx based on the status of the buffer Ml. The flowchart shown in FIG. 7 may be executed periodically (for example, at every 10 milliseconds) while the UE 10 is in operation.

It is first checked at step S10 whether an event, which is a predetermined trigger for changing the timer set value Tretx, occurred. The event, which triggers changing of the timer set value Tretx, may be determined arbitrarily. For example, the transmission of the SR by the transmission processing part F1 or a change in the amount of data in the buffer M1 may be set as the trigger.

When the event occurs as the predetermined trigger, step S10 results in YES and step S20 is executed. When the event does not occur as the trigger, step S10 results in NO and the set value changing-related processing of FIG. 7 is finished.

It is checked at step S20 whether the replacement value application buffer is empty. The replacement value application buffer is the buffer M14 for the LCG (that is, LCG4), to which the application X belongs. When the buffer M14 for the LCG4 as the replacement value application buffer is empty, step S20 results in YES and step S30 is executed. When the buffer M14 for the LSG4 is not empty, step S20 results in NO and step S40 is executed. The checking processing at step S20 corresponds to processing, which checks whether data of LCG belonging to a particular application (application X) is stored in the buffer M1.

At step S30, the delivered value Tdlv is set as the timer set value Tretx to thereby finishing the processing of FIG. 7. It is checked at step S40 whether data has arrived in the replacement value application buffer. When the data has arrived in the replacement value application buffer, step S40 results in YES and step S50 is executed. When the data has not arrived in the replacement value application buffer, step S40 results in NO and the processing of FIG. 7 is finished.

Figure 8:
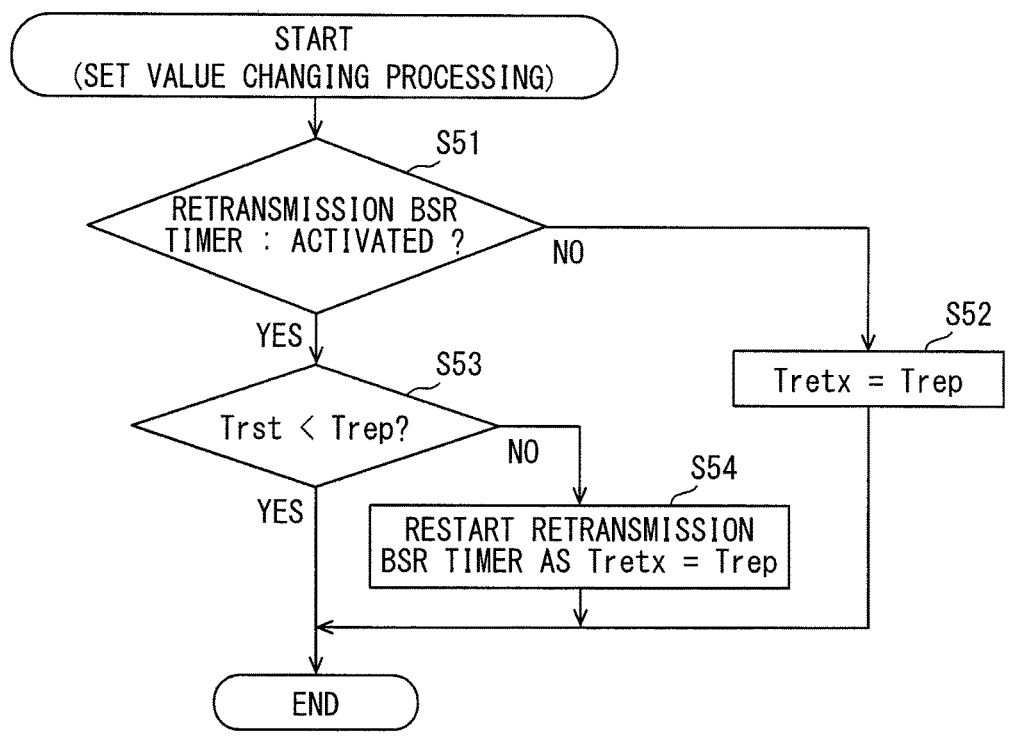
FIG. 8 is a flowchart showing set value changing processing performed in the embodiment.

At step S50, the set value changing part F5 performs the set value changing processing thereby finishing the set value changing-related processing. The set value changing processing will be described with reference to a flowchart shown in FIG. 8. This set value changing processing of FIG. 8 is executed when the set-value changing-related processing of FIG. 7 is shifted to step S50 in FIG. 7.

It is checked at step S51 whether the retransmission BSR timer F31 has been activated. When the retransmission BSR timer F31 has been activated, step S51 results in YES and step S53 is executed. When the retransmission BSR timer F31 has not been activated, step S51 results in NO and step S52 is executed.

At step S52, the delivered value Tdlv is set as the timer set value Tretx to thereby finishing the set value changing processing. When this set value changing processing is finished, the set value changing-related processing shown in FIG. 7 is also finished.

It is then checked at step S53 whether the remaining time Trst (that is, present count value) remaining until the retransmission BSR timer F31 expires is smaller than the replacement value Trep. When the remaining time Trst is smaller than the replacement value Trep, step S63 results in YES thereby finishing this processing. When the remaining time Trst is equal to or larger than the replacement value Trep, step S53 results in NO and step S54 is executed.

At step S54, the replacement value Trep is set as the timer set value Tretx. Then the retransmission BSR timer F31 is restarted (that is, reactivated) thereby finishing the set value changing processing. In the restarting, the time elapse after transmission of the BSR is reset to 0 once and counting of time is started again. Specifically, in the present embodiment, in which the retransmission BSR timer F31 is operated in the countdown method, the count value is set to the replacement value Trep and down-counting is restarted. When the timer is operated in the count-up method, on the other hand, the count value is reset to 0 and up-counting is restarted.

<Summarization of Present Embodiment>

Figure 9:
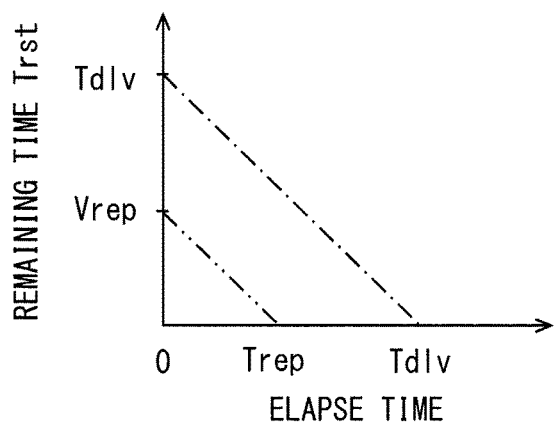
FIG. 9 is a graph showing one exemplary operation of the embodiment.

The operation of the present embodiment described above will be summarized as follows. First, when data is not stored in the replacement value application buffer, the delivered value Tdlv is set as the timer set value Tretx, that is, Tretx=Tdlv. For this reason, as indicated by a one-dot chain line in FIG. 9, the elapse time required for the retransmission BSR timer F31 to expire corresponds to the delivered value Tdlv.

When data is stored in the replacement value application buffer, the replacement value Trep is set as the timer set value Tretx, that is, Tretx=Tdlv. For this reason, as indicated by a two-dot chain line in FIG. 9, the time required for the retransmission BSR timer F31, which is activated when the data is stored in the replacement value application buffer, to expire corresponds to the replacement value Trep.

When data arrives in the replacement value application buffer even in a state that the retransmission BSR timer F31 is activated in the state that the data is not stored in the replacement value application buffer, a smaller one of the present count value and the replacement value Trep is used as the count value after the next moment.

Figure 10:
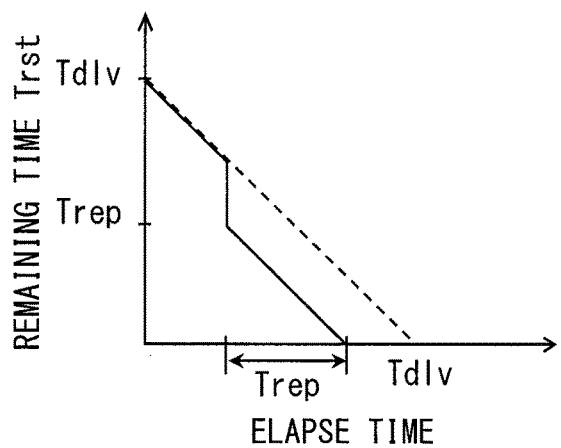
FIG. 10 is a graph showing another exemplary operation of the embodiment.

Specifically, when data arrives in the replacement value application buffer in the state that the count value is still larger than the replacement value Trep (step S53: YES), counting is restarted from the subsequent time by setting the count value to the replacement value Trep (step S54). As a result, as shown in FIG. 10, the time required for the retransmission BSR timer F31 to expire is shortened than the delivered value Tdlv.

According to the present embodiment, when data is not present in the replacement value application buffer, normal operation is attained by using the delivered value Tdlv. When data is present in the replacement value application buffer, the BSR is retransmitted by using the relatively small replacement value Trep as the timer set value Tretx.

That is, since retransmission of the BSR is performed by using the replacement value Trep only when data is present in the replacement value application buffer, it is possible to limit excessive retransmission of the SR and BSR. Further, since the retransmission of the BSR is performed by using the replacement value Trep when data is present in the replacement value application buffer, it is possible to shorten a wait time required until the retransmission BSR timer F31 expires. As a result, the communication control part 14 can provide the application X using the replacement value application buffer with the real-time property, which the application X requires.

The communication device described above is not limited to the embodiment described above but may be modified in many ways as described below.

In the following modifications, same parts having the same functions as those described in the present embodiment will be designated with the same reference numerals for simplicity.

[First Modification]

In the embodiment described above, the checking part F4 determines that the replacement value Trep need be applied as the timer set value Tretx when data belonging to the particular LCG is stored in the buffer M1.

However, the checking part F4 may determine that the replacement value Trep need be applied as the timer set value Tretx when data, to which the LCID corresponding to the particular application (for example, application X) is allocated, is stored in the buffer M1. That is, it may be determined as a first modification that the replacement value application condition is satisfied when the data, to which the particular LCID is allocated, is stored in the buffer M1.

This first modification may be realized as follows. First, contents of the checking processing at step S20 in FIG. 7 is replaced with checking processing, which checks whether data, to which the particular LCID is allocated, is stored.

Further, contents of the checking processing at step S40 is replaced with checking processing, which checks whether data, to which the particular LCID is allocated, arrived. The LCID allocated to the data may be identified by referring to an identifier such as a header or the like.

The first modification also provides the similar advantage as the embodiment described above provides.

[Second Modification]

In the embodiment and the first modification described above, it is estimated indirectly by using the LCG or LCID whether the data generated by the particular application (application X) is stored in the buffer M1.

In a case that it is possible to specify the origin of generation of data by referring to a particular field (for example, header) of data stored in the buffer M1, the checking part F4 may determine that the replacement value application condition is satisfied when the data generated by the particular application is stored in the buffer M1. Here, the field is a bit train provided in a particular position.

[Third Modification]

In the embodiment described above, the checking part F4 determines that the replacement value Trep need be applied as the timer set value Tretx when data belonging to the particular LCG or LCID is stored in the buffer M1. However, as a third modification, the checking part F4 may determine that the replacement value Trep need be applied as the timer set value Tretx when data is stored in the buffer M1.

Figure 11:
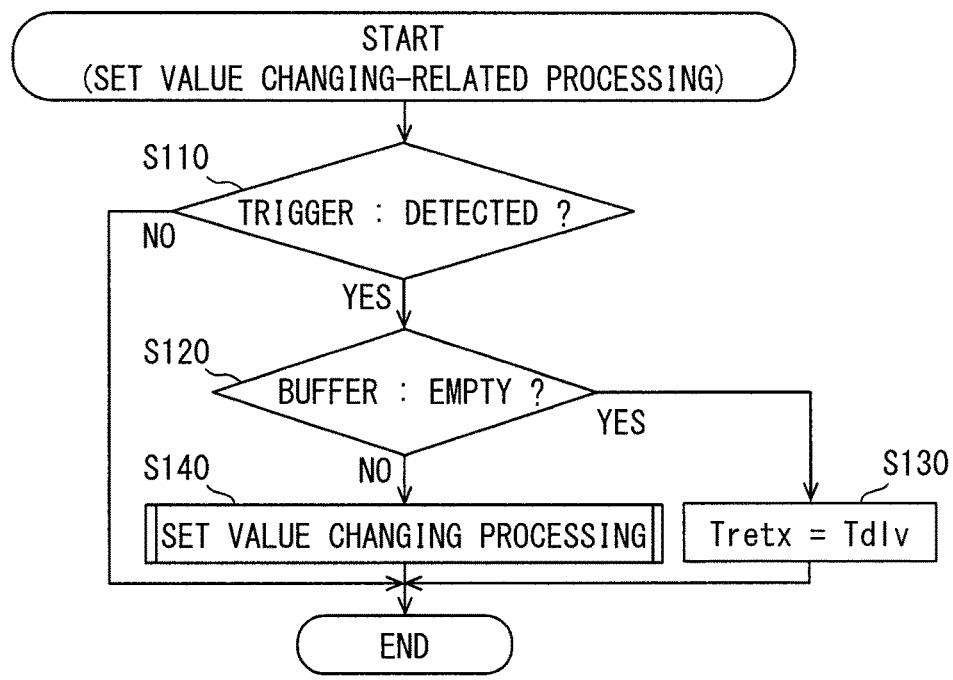
FIG. 11 is a flowchart showing set value changing-related processing performed in a third modification example.

The third modification will be described with reference to a flowchart shown in FIG. 11. The flowchart shown in FIG. 11 shows set value changing-related processing, which is executed by the communication control part 14 in the third modification. That is, the processing of FIG. 11 corresponds to that of FIG. 7.

It is first checked at step S110 whether an event, which is a predetermined trigger for changing the timer set value Tretx, occurred. The event, which triggers changing of the timer set value Tretx, may be determined arbitrarily as described above. When the event occurs as the predetermined trigger, step S110 results in YES and step S120 is executed. When the event does not occur as the predetermined trigger, step S110 results in NO and this processing is finished.

It is checked at step S120 whether the buffer M1 is empty. When the buffer M1 is empty, step S120 results in YES and step S130 is executed. When the buffer M1 is not empty, step S120 results in NO and step S140 is executed.

At step S130, the timer set value Tretx is set to the delivered value Tdlv thereby finishing the present processing. At step S140, the set value changing part F5 performs the set value changing processing thereby finishing the present processing. The set value changing processing executed at step S140 is the same as that described with reference to the flowchart shown in FIG. 7.

The third modification described above is particularly advantageous in a case that the number of types of applications installed in the UE 10 is one. In a case that the installed application is only one type, data arriving in the buffer M1 are mostly generated by the installed application itself. Further, in a case that the application installed in the UE 10 is only one type, the real-time property of radio communication required to the UE 10 is the real-time property, which the installed application requests itself.

For this reason, in a case that the application installed in the UE 10 is only one type, it is possible to set a value suitable for the real-time property, which the application requires for the radio communication function provided by the UE 10, as the timer set value Tretx by implementing the third modification.

This third modification may of course be applied even in a case that plural types of applications are installed in the UE 10. It is preferred in such a case that the real-time properties required by the installed plural applications are generally of similar level. That is, the third modification is also advantageous in a case that required delay values of the plural applications are common.

[Fourth Modification]

In the embodiment described above, the replacement value Trep of the timer set value Tretx is exemplified to be smaller than the delivered value Tdlv. However, without being limited to such an exemplified value, the replacement value Trep is only required to satisfy the real-time property, which an application (main application) corresponding to a main purpose for the UE 10 to perform radio communication requires.

For example, in a case that the main application of the UE 10 is a stationary application, which does not require real-time property, the replacement value Trep may be a value, which lengthens the time required for the retransmission BSR timer F31 to expire to be longer than time designated by the radio base station 20 (that is, delivered value Tdlv). For example, the replacement value Trep may be a maximum value in a variable range of the delivered value Tdlv or larger than the maximum value.

The application, which does not require real-time property, is an application, which does not require frequent radio communications. For example, such applications include applications, which remotely monitor an operation status of a machine tool such as a heavy duty machine and an inventory status of an automatic vending machine. In such applications, it is only necessary to upload data indicating operation states of devices to be monitored to a predetermined server at a relatively long interval, for example, at every several minutes or several tens of minutes. For this reason, the communication delay, which accompanies the wait time until the retransmission BSR timer F31 expires, is not problematical in providing services corresponding to the application.

Figures 12, 13:
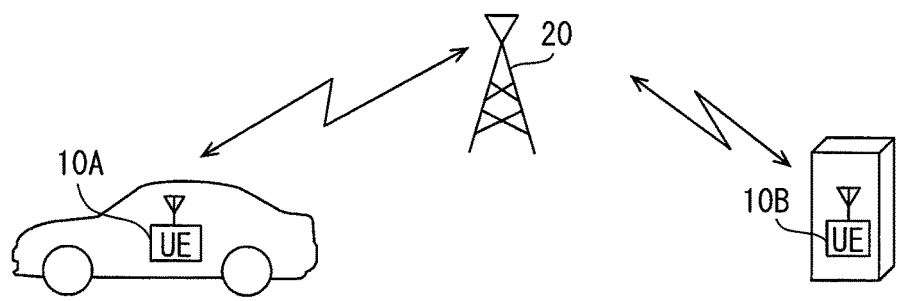
FIG. 12 is an illustration showing a replacement value corresponding to the user equipment in a fourth modification.
FIG. 13 is a table showing one example of a replacement value in correspondence to the user equipment in the fourth modification.

According to the fourth modification, it is possible to use the replacement value Trep in correspondence to the method of use of the UE 10. One exemplary use will be described with reference to FIG. 12. A UE 10A shown in FIG. 12 is the UE 10 used in a vehicle and is installed a main application, which requires real-time property. A UE 10B is also the UE 10 used in an automatic vending machine and is installed only a relatively stationary application (for example, inventory managing application).

In such a system, by setting provisionally the replacement value Trep in the UE 10A to a relatively small value, it is possible to shorten a delay in retransmission of the BSR in the UE 10A and enhance the real-time property. Further, by setting provisionally the replacement value Trep in the UE 10B to a relatively large value and setting a control status to be the same as described in the third modification, it is possible to limit retransmission of the BSR. The set value changing-related processing in the UE 10A may be the same as that of any one of the embodiment, first modification and the third modification.

The replacement value Trep may be set in correspondence to the use of the UE 10 as exemplified in FIG. 13. For example, the replacement value of the UE 10 used in the vehicle may be set to a relatively small value (for example, 10) and the replacement value of the automatic vending machine may be set to a relatively large value (for example, 640). Further, the replacement value Trep of the mobile phone or the tablet terminal, in which various applications are supposed to be installed, may be set to an intermediate value (for example 320).

[Fifth Modification]

In the embodiment and modifications described above, the replacement value Trep corresponding to the particular application is exemplified to be pre-registered independently of various time parameters (existing parameters), which are used in performing the radio communications conforming to the LTE. However, the predetermined time parameter other than the delivered value among the existing parameters may be appropriated as the replacement value Trep.

Here, the time parameter is a parameter, which relates to time. For example, various set values of the timer belong to the time parameter. For example, the set parameters such as the set value of the periodic BSR timer, which are other than the retransmission BSR timer. When the fifth modification is implemented, the storage area storing the existing parameter, which are used as the replacement value, corresponds to a replacement value storing part.

[Sixth Modification]

In the embodiment and the modifications described above, the radio communication system 100 is exemplified as a system, which provides radio communications conforming to the LTE. However, the radio communication system 100 may be a HSPA and the like, which provide radio communications conforming to communication standards other than the LTE.

What is claimed is:

1. A communication device for radio communication with a radio base station in a radio communication system, wherein the communication device includes a transmission processing part and a retransmission processing part, the transmission processing part transmitting a buffer status report, which indicates an amount of data remaining in a buffer, to the radio base station, and the retransmission processing part performing processing for retransmitting the buffer status report when an elapse of time after transmission of the buffer status report reaches a timer set value, and the radio base station allocates a communication resource for the communication device in accordance with the amount of data indicated by the buffer status report transmitted from the communication device, the communication device comprising:

a delivered value storing processing part for acquiring a delivered value, which is delivered from the radio base station and to be used as the timer set value, and storing the delivered value in a delivered value storing part, which is provided by a predetermined storage medium;

a replacement value storing part for pre-storing a replacement value, which is settable as the timer set value in place of the delivered value;

a checking part for checking whether a replacement value application condition for using the replacement value as the timer set value is satisfied; and a set value changing part for setting the replacement value as the timer set value when the checking part determines that the replacement value application condition is satisfied, and setting the delivered value as the timer set value when the checking part fails to determine that the replacement value application condition is satisfied.

2. The communication device according to claim 1, wherein:

the replacement value is preset to a value, which realizes a small delay property required by a particular application software, which uses a radio communication function of the communication device.

3. The communication device according to claim 2, wherein:

the replacement value is a time parameter, which is one of time parameters used in communication control with the radio base station, and different from the delivered value.

4. The communication device according to claim 2, wherein:
plural logical channel identifiers are provided for controlling data transmission to the radio base station;
the application software has a predetermined logical channel identifier;
the data stored in the buffer has a field indicating the logical channel identifier correlated to the application software, which is an origin of generation of the data; and
the checking part determines that the replacement value application condition is satisfied when the data having the logical channel identifier correlated to the application software is in the buffer.

5. The communication device according to claim 2, wherein:
the data transmitted to the radio base station is correlated to either one of the plural logical channels, which are provided for controlling data transmission to the radio base station;
the logical channel identifier belongs to either one preset plural logical channel groups;
the application software is correlated to the predetermined logical channel identifier;
the data stored in the buffer has a field indicating the logical channel identifier correlated to the application software, which is an origin of generation of the data; and
the checking part determines that the replacement value application condition is satisfied when the data of the logical channel group, to which the logical channel identifier corresponding to the application software belongs, is in the buffer.

6. The communication device according to claim 2, wherein:
the checking part determines that the replacement value application condition is satisfied when the data is present in the buffer.

7. The communication device according to claim 2, wherein:
the checking part determines that the replacement value application condition is satisfied when the data generated by the application software is present in the buffer.

8. The communication device according to claim 1, wherein:
the replacement value is preset to a value corresponding to a purpose of the communication device; and
the checking part determines that the replacement value application condition is satisfied when the data is present in the buffer.

9. The communication device according to claim 1, further comprising:
a retransmission BSR timer for measuring an elapse of time after transmission of the buffer status report and checking whether a measured time reached the timer set value, wherein
the retransmission BSR timer is activated in response to transmission of the buffer status report by the transmission processing part as a trigger;
the set value changing part sets the replacement value as the timer set value, when the checking part determines that the replacement value application condition is satisfied after activation of the retransmission BSR timer and time remaining for the elapse of time to reach the timer set value is larger than the replacement value; and
the retransmission BSR timer is reactivated at the time of setting the replacement value as the timer set value.

* * * * *